United States Patent
Robertson, Jr. et al.

(10) Patent No.: US 9,651,059 B2
(45) Date of Patent: May 16, 2017

(54) ADHESIVE PATTERN FOR FAN CASE CONFORMABLE LINER

(71) Applicant: United Technologies Corporation, Hartford, CT (US)

(72) Inventors: Thomas J. Robertson, Jr., Glastonbury, CT (US); Darin S. Lussier, Guilford, CT (US); Kirk D. Stackhouse, Marshalltown, IA (US); Johan Santana, Westerly, RI (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1369 days.

(21) Appl. No.: 13/728,200

(22) Filed: Dec. 27, 2012

(65) Prior Publication Data
US 2014/0186165 A1   Jul. 3, 2014

(51) Int. Cl.
*F04D 29/52* (2006.01)
*F04D 29/02* (2006.01)
*F01D 11/12* (2006.01)

(52) U.S. Cl.
CPC .......... *F04D 29/526* (2013.01); *F01D 11/122* (2013.01); *F01D 11/127* (2013.01); *F04D 29/023* (2013.01); *F05D 2220/36* (2013.01); *F05D 2250/283* (2013.01); *F05D 2300/431* (2013.01); *F05D 2300/501* (2013.01); *Y02T 50/672* (2013.01)

(58) Field of Classification Search
CPC ...... F01D 25/246; F01D 11/12; F01D 11/122; F01D 11/125; F01D 11/127; F01D 11/14; F01D 11/16; F01D 11/18; F05D 2300/43; F05D 2250/283; F05D 2220/36; F05D 2300/501; B32B 37/0076; B32B 37/1292
See application file for complete search history.

(56) References Cited

U.S. PATENT DOCUMENTS

| | | | |
|---|---|---|---|
| 3,085,398 A | 4/1963 | Ingleson | |
| 4,251,185 A | 2/1981 | Karstensen | |
| 4,349,313 A | 9/1982 | Munroe et al. | |
| 4,354,687 A | 10/1982 | Holland et al. | |
| 5,062,767 A * | 11/1991 | Worley | F01D 9/042 415/190 |
| 5,160,248 A | 11/1992 | Clarke | |
| 5,288,538 A * | 2/1994 | Spears | B29C 44/1228 156/197 |
| 5,344,280 A | 9/1994 | Langenbrunner et al. | |
| 6,382,905 B1 | 5/2002 | Czachor et al. | |
| 6,425,736 B1 * | 7/2002 | McMahon | F01D 9/042 415/173.4 |
| 6,468,026 B1 | 10/2002 | Bonnoitt et al. | |
| 6,637,186 B1 | 10/2003 | Van Duyn | |
| 6,759,151 B1 * | 7/2004 | Lee | C04B 41/009 416/241 B |
| 7,210,899 B2 | 5/2007 | Wilson, Jr. | |

(Continued)

*Primary Examiner* — Richard Edgar
*Assistant Examiner* — Eldon Brockman
(74) *Attorney, Agent, or Firm* — Carlson, Gaskey & Olds, P.C.

(57) ABSTRACT

A section of a gas turbine engine includes a case structure and a liner. The liner is attached to the case structure by a compliant adhesive. The adhesive covers at least a portion of the liner surface area, and can have interruptions used to tune the compliance of the adhesive layer.

15 Claims, 2 Drawing Sheets

(56) References Cited

U.S. PATENT DOCUMENTS

| | | |
|---|---|---|
| 7,914,251 B2 | 3/2011 | Pool et al. |
| 8,061,967 B2 | 11/2011 | Marlin et al. |
| 8,202,041 B2 | 6/2012 | Wojtyczka et al. |
| 9,108,385 B2* | 8/2015 | Deschamps ............... B32B 3/12 |
| 2008/0253885 A1* | 10/2008 | Foose .................... F01D 5/147 |
| | | 415/208.2 |
| 2010/0126798 A1* | 5/2010 | Lalane .................... F02C 7/045 |
| | | 181/222 |
| 2011/0211943 A1* | 9/2011 | Belbeck ................. F01D 11/12 |
| | | 415/182.1 |
| 2011/0232833 A1* | 9/2011 | Collins ................ F01D 11/127 |
| | | 156/165 |
| 2011/0293411 A1* | 12/2011 | Deschamps ............... B32B 3/12 |
| | | 415/200 |
| 2013/0129494 A1* | 5/2013 | Duchaine ................ F01D 9/041 |
| | | 415/191 |
| 2013/0202418 A1* | 8/2013 | Ditomasso ............ F01D 11/122 |
| | | 415/136 |

* cited by examiner

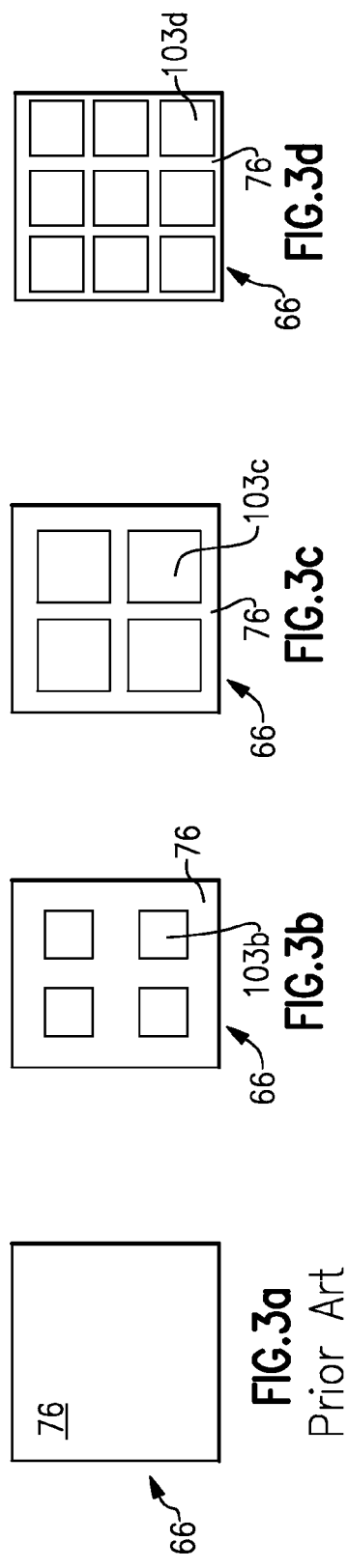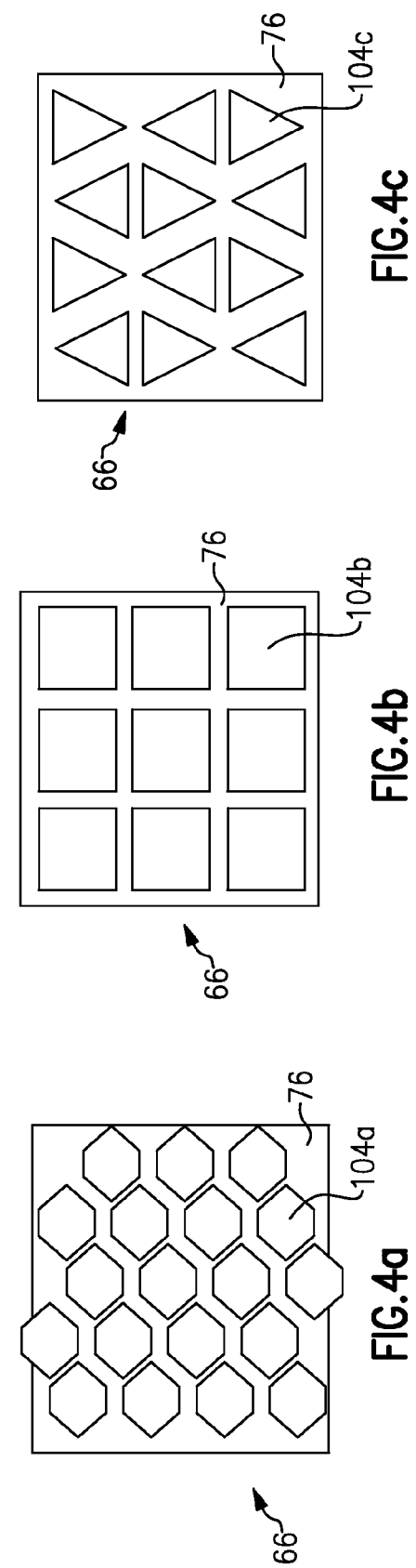

ADHESIVE PATTERN FOR FAN CASE CONFORMABLE LINER

BACKGROUND

This disclosure relates to a section of a gas turbine engine, for example, a fan section, and, in particular, to a conformable liner for the fan section.

One type of gas turbine engine includes a core engine having compressor and turbine sections that drive a fan section. The fan section includes circumferentially arranged fan blades disposed within a fan case. The fan section is subject to large temperature fluctuations throughout engine operation. A minimized clearance tight seal is desired between the tips of the fan blades and the fan case throughout engine operation at the various operating temperatures.

One system has been proposed to accommodate thermal expansion and contraction in a fan section having aluminum fan blades. Leaf members are fastened to the fan case with a fastening element such as an adhesive or pins. The leaf members allow the liner to expand and contract uniformly relative to the composite liner to maintain a tight clearance during temperature fluctuations, improving the fan blade tip clearance and overall fan efficiency.

SUMMARY

In one exemplary embodiment, a fan section of a gas turbine engine includes a case structure. The fan section includes a continuous ring-shaped conformable liner with a surface area, and an adhesive layer that attaches the liner to the case structure. The adhesive layer includes interruptions.

In a further embodiment of any of the above, the liner is a metallic material with a coefficient of thermal expansion greater than 8E-06/deg.F.

In a further embodiment of any of the above, the case structure includes a fan case constructed from a composite material with a coefficient of thermal expansion less than 4E-06/deg.F.

In a further embodiment of any of the above, the fan section includes a honeycomb structure supported radially inward from and on the fan case. The liner is radially inward of the honeycomb structure.

In a further embodiment of any of the above, the liner supports a rub strip comprised of an abradable material and arranged radially inward of the liner.

In a further embodiment of any of the above, the fan section additionally includes circumferentially arranged fan blades disposed within the case structure. The fan blades each have a tip immediately adjacent to the rub strip.

In a further embodiment of any of the above, the adhesive layer has a thickness in the range of 0.010 inch-0.250 inch (0.254 mm-6.35 mm).

In a further embodiment of any of the above, the case structure has a first coefficient of thermal expansion and the liner has a second coefficient of thermal expansion different from the first coefficient of thermal expansion.

In a further embodiment of any of the above, the adhesive layer has an elongation to failure of greater than 200%.

In a further embodiment of any of the above, the compliant adhesive is an elastomeric silicone.

In a further embodiment of any of the above, the compliant adhesive is a polysulfide rubber.

In a further embodiment of any of the above, the adhesive has at least one perforation.

In a further embodiment of any of the above, the at least one perforations have a hexagonal shape.

In a further embodiment of any of the above, the at least one perforations have a rectangular shape.

In a further embodiment of any of the above, the at least one perforations have a triangular shape and are arranged in an isogrid pattern.

BRIEF DESCRIPTION OF THE DRAWINGS

The disclosure can be further understood by reference to the following detailed description when considered in connection with the accompanying drawings wherein:

FIGS. 3a-3d show exemplary adhesive coverage proportions.

FIGS. 4a-4c show exemplary adhesive patterns.

DETAILED DESCRIPTION

Figure 1:
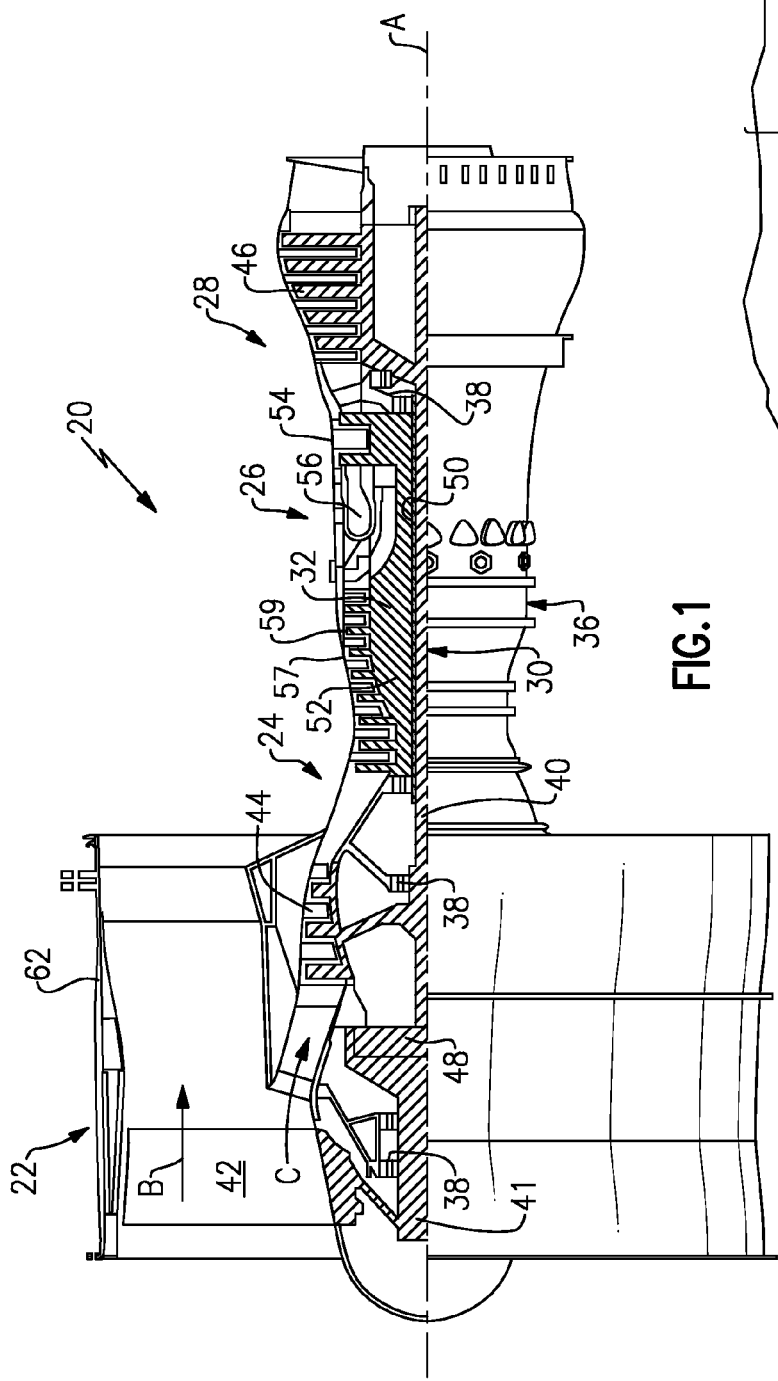
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram}\,°\text{R})/(518.7°\,\text{R})]^{0.5}$. The "Low corrected fan tip speed", as disclosed herein according to one non-limiting embodiment, is less than about 1150 ft/second.

Figure 2:
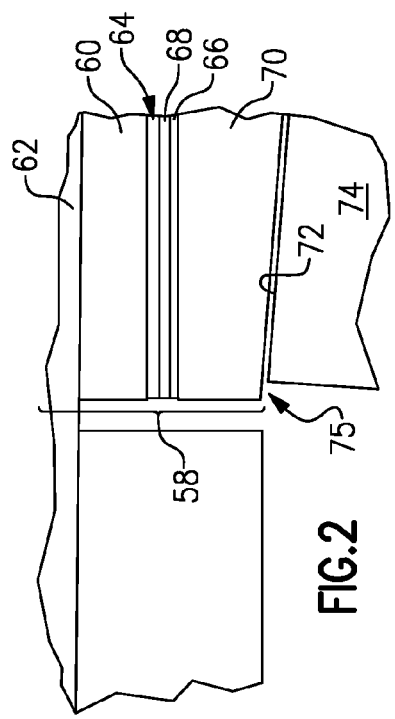
FIG. 2 schematically shows a portion of the fan case and liner.

Referring to FIG. 2, the fan section 22 includes a fan case structure 58, which includes a composite fan case 62. The composite fan case can be constructed from carbon fiber and resin, for example. A honeycomb structure 60, which may be constructed from aluminum, is supported radially inward from and on the fan case 62. A septum 64 is arranged radially inward from and supported by the honeycomb structure 60. In one example, the septum 64 is also a composite structure constructed from fiberglass and resin. As can be appreciated, composite structures have relatively low coefficients of thermal expansion (e.g., less than 4E-06/deg.F.) and are dimensionally stable throughout the various operating temperatures.

A continuous, ring-shaped liner 66, which is an aluminum alloy or another material with a similar coefficient of thermal expansion (e.g., greater than 8E-06/deg.F.) as the fan blades, for example, is supported by the fan case structure 58, and in the example shown, by the septum 64. An adhesive layer 68 connects the liner 66 to the septum 64. The fan case structure 58 and the liner 66 can have different coefficients of thermal expansion. Movement of the liner 66 causes the adhesive layer 68 to deform. The liner's 66 ability to deform the adhesive layer 68 is dependent on the modulus and thickness of the liner 66. Therefore, thick, stiff liners 66 with high coefficients of thermal expansion will more effectively deform the adhesive layer 68.

In one example, the adhesive layer 68 can be a compliant adhesive such as an elastomeric silicone or a polysulfide rubber. The compliant adhesive layer 68 has very low elastic modulus, for example, between 100 and 1000 psi, and very high elongation to failure, for example, greater than 200%. In one embodiment, the elongation to failure of the adhesive layer 68 is 400%. The adhesive layer 68 has a radial thickness in the range of 0.010 inch-0.250 inch (0.254 mm-6.35 mm) in one example. As can be appreciated, the compliant adhesive layer 68 allows the liner 66 to expand and contract independent of the fan case 62. The liner 66 supports a rub strip 70 that provides an abradable material immediately adjacent to the tips 72 of the fan blades 74. A blade tip clearance 75 is provided between the tips 72 and the rub strip 70.

It is desirable to maintain a minimal radial blade tip clearance throughout various fan section operating temperatures. The independent response of the liner 66 can provide improved tip clearance during various flight points, which can in turn increase fan efficiency. In cases where the thermal mismatch between the fan case 62 and the fan blades 74 is large, the independent response of the liner 66 is particularly desirable. It is desired that the expansion of the liner 66 is relatively uniform across the rub strip 70 to maintain concentricity with the fan 42

The adhesive layer 68 extends circumferentially about the liner 66 but includes interruptions in the adhesive material used to tune compliance of the adhesive layer 68 and, in turn, provide a desired thermal response of the liner 66. The liner 66 contracts with a certain force and the adhesive layer 68 stretches to resist the force. By reducing the amount of adhesive, there is less resistance to the contraction of the liner 66. This can generate greater equilibrium contraction or allow the thickness and weight of the liner 66 to be reduced.

The adhesive layer 68 can have a variety of configurations. In one example, the adhesive layer 68 has perforations, such that the adhesive 76 is applied to portions of the liner 66 surface area and other portions of the liner 66 surface area are void of adhesive to provide a reduced bond surface area. As is shown in FIG. 3*a* and known from the prior art, the adhesive layer 68 has no interruptions. In the present invention, the adhesive layer 68 has interruptions corresponding to open areas of, for example, 50%, 25%, or 10% area of the adhesive layer 68, which provide voids 103*b*, 103*c*, 103*d*, as is shown in FIGS. 3*b*-3*d*, respectively. Of course, any amount of interruptions may be used depending upon the compliance of the adhesive material and the radial thickness of the adhesive layer.

In another example, shown in FIGS. 4*a*-4*c* respectively, the adhesive 76 can have perforations 104*a*, 104*b*, 104*c* with hexagonal, rectangular, triangular, or any suitable shape. As is seen in FIG. 4*c*, triangular perforations 104*c* can be arranged in an isogrid pattern. Application of the adhesive 76 with such interruptions or perforation patterns facilitates uniform expansion of the liner 66 and allows the liner 66 to expand and contract as desired. As can be appreciated, there are other geometries and web patterns that may be used.

Although an example embodiment has been disclosed, a worker of ordinary skill in this art would recognize that certain modifications would come within the scope of the claims. For that reason, the following claims should be studied to determine their true scope and content.

What is claimed is:

1. A fan section of a gas turbine engine comprising:
   a fan case,
   a septum radially inward of the fan case having a septum surface with a septum surface area,
   a continuous ring-shaped conformable liner with a liner surface having a liner surface area; and
   an adhesive layer attaching the liner surface to the septum surface, wherein the adhesive layer includes interruptions provided by voids of unapplied adhesive on both the liner surface area and the septum surface area; wherein
   the voids of unapplied adhesive define open areas radially between the liner surface area and the septum surface area to provide a reduced bond surface area.

2. The fan section of claim 1, wherein the liner is a metallic material with a coefficient of thermal expansion greater than 8E-06/deg.F.

3. The fan section of claim 2, wherein the fan case is constructed from a composite material with a coefficient of thermal expansion less than 4E-06/deg.F.

4. The fan section of claim 3, comprising a honeycomb structure supported radially inward from and on the fan case, the liner radially inward of the honeycomb structure.

5. The fan section of claim 4, wherein the liner supports a rub strip comprised of an abradable material and arranged radially inward of the liner.

6. The fan section of claim 5, additionally including circumferentially arranged fan blades disposed within the fan case, wherein the fan blades each have a tip immediately adjacent to the rub strip.

7. The fan section of claim 1, wherein the adhesive layer has a thickness in the range of 0.010 inch-0.250 inch (0.254 mm-6.35 mm).

8. The fan section of claim 1, wherein the fan case has a first coefficient of thermal expansion and the liner has a second coefficient of thermal expansion different from the first coefficient of thermal expansion.

9. The fan section of claim 1, wherein the adhesive layer has an elongation to failure of greater than 200%.

10. The fan section of claim 9, wherein the adhesive is an elastomeric silicone.

11. The fan section of claim 9, wherein the adhesive is a polysulfide rubber.

12. The fan section of claim 1, wherein the adhesive has at least one perforation providing the voids.

13. The fan section of claim 12, wherein the at least one perforations have a hexagonal shape.

14. The fan section of claim 12, wherein the at least one perforations have a rectangular shape.

15. The fan section of claim 12, wherein the at least one perforations have a triangular shape and are arranged in an isogrid pattern.

* * * * *